United States Patent [19]

Munter et al.

[11] 4,364,963
[45] Dec. 21, 1982

[54] FOOD PREPARATION PROCESS

[75] Inventors: Arnold M. Munter; David W. Ahlgren, both of Duluth, Minn.

[73] Assignee: Jeno's, Inc., Duluth, Minn.

[21] Appl. No.: 303,556

[22] Filed: Sep. 18, 1981

[51] Int. Cl.³ .......................... A21D 8/02; A21B 3/13
[52] U.S. Cl. ..................... 426/283; 426/391; 426/393; 426/420; 426/523; 426/524
[58] Field of Search .............. 426/138, 95, 92, 94, 426/90, 390, 391, 502, 496, 275, 283, 128, 113, 139, 505, 514, 393, 512, 132, 124, 523, 420, 302, 524; 99/DIG. 15, 381, 432, 433, 428, 353, 426

[56] References Cited

U.S. PATENT DOCUMENTS

| | | | |
|---|---|---|---|
| 1,097,367 | 5/1914 | Sabin | 99/433 |
| 1,612,551 | 12/1926 | Twoney | 99/DIG. 15 |
| 1,815,527 | 7/1931 | Scruggs | 426/139 |
| 2,111,021 | 3/1938 | Bemis | 426/391 |
| 2,363,395 | 11/1944 | Calia | 426/283 |
| 2,768,086 | 10/1956 | Bliley | 426/128 |
| 3,031,309 | 4/1962 | Bogner et al. | 426/94 |
| 4,065,581 | 12/1977 | Heiderpriem | 426/138 |
| 4,137,333 | 1/1979 | Daswick | 426/113 |
| 4,265,919 | 5/1981 | Munter et al. | 426/132 |

Primary Examiner—Steven L. Weinstein
Attorney, Agent, or Firm—Hume, Clement, Brinks, Willian & Olds, Ltd.

[57] ABSTRACT

An improved food preparation process is disclosed. In order to practice the process, a container is provided which has a centrally-depressed receptacle with an outwardly and downwardly extending rim. A food filling is first deposited in the container receptacle. The container receptacle and rim are then covered with a sheet of unbaked dough so that the dough conforms to the container rim. The now-filled and covered container which comprises the food product is then frozen. The frozen product filled container is inverted in a conventional oven and heat is applied. A seal is formed between the dough sheet and the container at the juncture of the container walls and rim. The filling heats to a fluid state. When the container is removed, the filling flows outwardly to fill the upstanding crust formed by the baked dough.

4 Claims, 6 Drawing Figures

FOOD PREPARATION PROCESS

FIELD OF THE INVENTION

This invention relates to food preparation. It relates particularly to an improved process for preparing a food product.

BACKGROUND OF THE INVENTION

The inventors disclosed a process for producing a frozen food product in their U.S. Pat. No. 4,265,919. Incident to disclosing that process they described a complete food preparation process in which their food product was employed.

It was found, in practice of the food preparation process, that very liquidy fillings could not successfully be employed. Liquidy fillings, when hot and, thus, possessors of very thin consistency, would tend to escape between the container rim and the dough sheet when the container was inverted and before removal of the container.

SUMMARY OF THE INVENTION

An object of the present invention is to provide a new and improved food preparation process.

According to the invention the process involves utilization of the container disclosed in the aforementioned patent. The container has a centrally depressed receptacle and an outwardly and downwardly extending rim. A pre-prepared filling is deposited in the container receptacle. The container receptacle and rim are then covered with a sheet of unbaked dough so that the dough conforms to the container rim. The filled and covered container is then frozen. The filled and frozen container is then inverted on a flat surface such as a cookie tin and placed in an oven. The oven heats the filling to a liquid state. At the same time the dough bakes to a crust. A seal forms between the crust and the rim of the container, particularly where the rim joins the receptacle. The seal holds the liquid in the receptacle. Only when the seal is broken by removal of the container does the filling flow outwardly to fill the upstanding crust.

These and other objects, features and advantages of the present invention will be apparent from the following description, appended claims and annexed drawings.

DETAILED DESCRIPTION OF THE PREFERRED EMBODIMENTS

Figure 1:
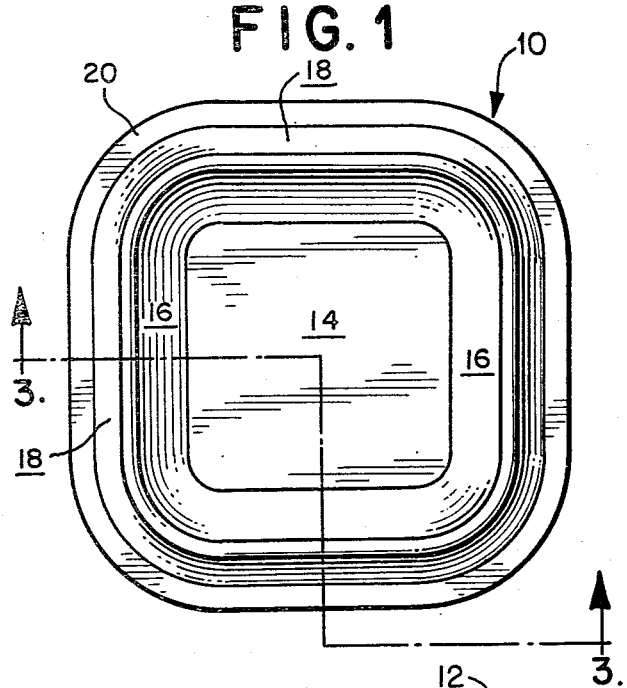
FIG. 1 is a plan view of the top of a container which may be utilized in the process described herein.

In the Figures the container is generally indicated by the numeral 10. The container 10 is typically three hundredths (0.03) of an inch thick, and is constructed of ovenable material such as fibrous paperboard. However, other conventional materials such as aluminum may alternatively be used. The term "ovenable" as used herein is intended to define a material which can sustain oven temperatures of up to approximately 425 degrees Fahrenheit for up to 45 minutes without adverse effect.

The container 10 includes a centrally-depressed receptacle 12 which is defined by a base 14 at the bottom of the container 10, and sidewalls 16. In the preferred embodiment depicted in the Figures, the sidewalls 16 slope outwardly at an angle of 22.5 degrees from vertical. In certain applications, particularly with respect to pizzas, it may be desirable that this angle be substantially greater, that is, that the container be substantially shallower and flatter than the depicted, preferred, embodiment.

The container 10 also includes an outwardly and downwardly extending rim 18. The rim 18 typically extends at the same angle from the vertical as the sidewalls 16, i.e., 22.5 degrees in the depicted embodiment. In certain instances, it may be desirable that the rim extend outwardly and then downwardly, but this is normally not the preferred arrangement.

The rim 18 preferably terminates in an outwardly extending flange 20. This flange 20 is typically parallel to the base 14, as shown in the Figures.

Figure 2:
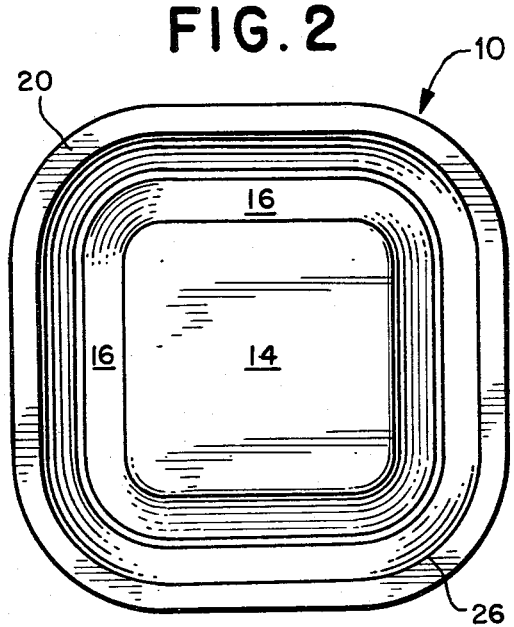
FIG. 2 is a plan view of the underside of the container depicted in FIG. 1.
Figure 3:
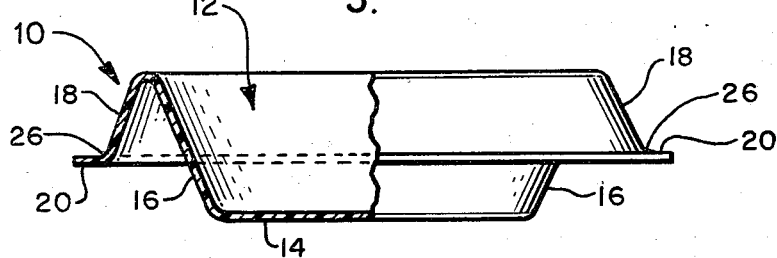
FIG. 3 is a partially sectioned elevation view taken along line 3—3 of FIG. 1.

In the depicted embodiment the base 14 of the container 10 is substantially square with rounded corners. The sidewalls 16, rim 18 and flange 20 extending directly or indirectly from the base 14 therefore similarly define a rounded-corner square, as shown best in the plan views of FIGS. 1 and 2. It should be understood, however, that the container may be any other shape in plan, such as rectangular or even round.

The first step of the present process is to deposit a pre-prepared filling 22 in the container receptacle 12. The term "pre-prepared" merely means that the ingredients have been mixed to the extent necessary. They need not be pre-cooked although in some applications this may be preferable.

The types of fillings which may be used with this invention are widely varied. They include various pot pies, egg dishes, pizza, ethnic dishes and any other type of dish that becomes fluid when a sufficient amount of heat is applied to it.

It may be desirable to add the filling 22 in a series of steps when the filling 22 will include a plurality of layers. For example, when a pizza-like product is produced, it will normally be desirable to add the meat first, then the cheese and other mixed toppings, and finally the sauce. Thus, it can be seen that when such layering is desirable, the layer to be positioned furthest from the dough is added first, with the layer adjacent to the dough being added last.

The filling 22 normally extends no higher than the top of the sidewall 16, and may be considerably below this level, particularly when it is desirable that the filling not be in contact with the sheet of dough 24 which is subsequently laid over the filled container 10.

Figure 4:
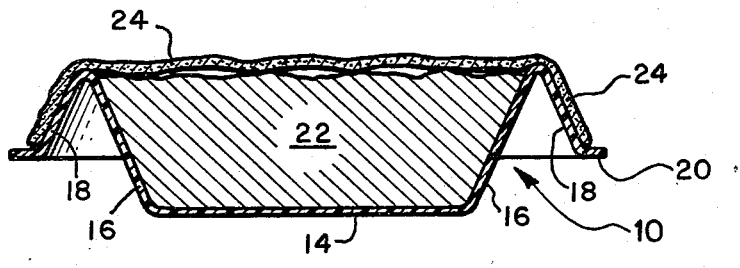
FIG. 4 is a sectioned elevation view of a filled and covered upright container of the type depicted in FIG. 1.

The addition of this sheet of dough 24 comprises the next step of the process. The dough sheet 24 is sized and shaped such that it extends over the now-filled receptacle 12 and conforms to the outwardly and downwardly extending rim 18. Preferably the dough sheet extends no further than the intersection between the outwardly and downwardly extending portion of the rim 18 and the outwardly extending flange 20, as best shown in FIG. 4. This intersection between the rim 18 and its flange 20 is identified with the numeral 26.

The reason it is desirable that the dough sheet 24 not extend outward with the flange 20 is so that the flange 20 can protect the dough sheet 24 from physical abuse and resulting flaking and/or breakage of the dough sheet 24. It also permits a wrapping (not shown) to be stretched over the container 10 without contacting the edge of the dough sheet 24. Moreover, it prevents the dough from curling around the edge of the rim 18 which would prevent removal of the container 10 after baking.

It may be desirable in certain instances for the dough sheet 24 to stop short of the intersection 26, but in such case the crust formed by the dough sheet 24 would be shallower and therefore would retain less filling 22, as explained more fully hereinbelow. In any event, the coverage by the dough sheet 24 of the container receptacle 12 ensures that the filling 22 will be kept fresh and dehydration will be minimized.

The next step in this process is to freeze the now-filled and covered container 10. In this frozen condition the food product can be stored in an upright condition for extended periods without dehydration of the filling 22 or absorption of moisture from the filling 22 into the dough sheet 24. Moreover, the configuration of the container 10 will minimize the possibility of damage to the dough sheet.

Figure 5:
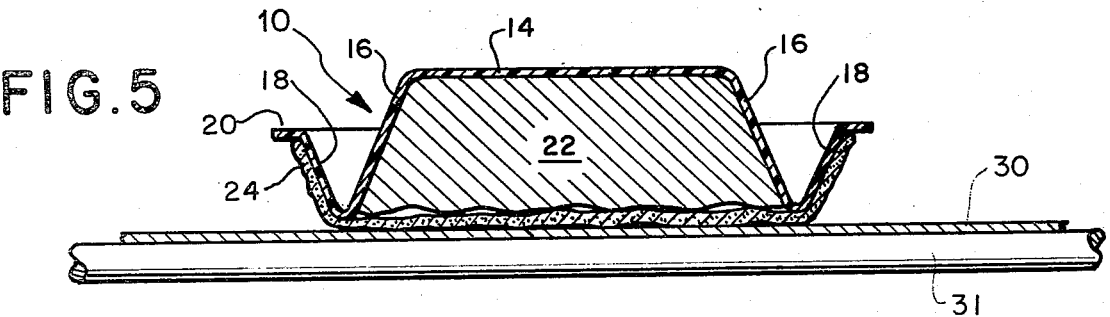
FIG. 5 is a sectioned elevation view of the filled frozen container inverted on a cookie tin and disposed in an oven.

The next step is to invert the frozen product on a cookie tin 30 and place it on an oven shelf 31, as seen in FIG. 5. A sufficient amount of heat is applied to bake the dough sheet 24 and heat the filling 22 to a fluid state. In the present invention the filling is sometimes very liquidy. However, a seal forms between the dough and the container rim to prevent this liquid from escaping.

Figure 6:
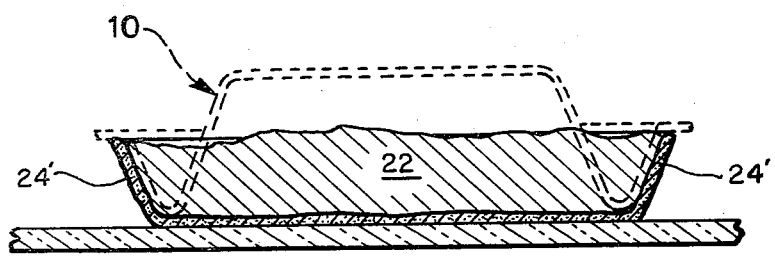
FIG. 6 is a sectioned elevation view of the food product with the container removed and the container shown in its position prior to removal in dotted lines.

When the container is removed the seal is broken. The filling 22 flows outward. This condition is depicted in FIG. 6, with the original position of the container 10 indicated in dotted lines.

This inventive process thus produces a final food product which consists of an upstanding crust (indicated by the numeral 24') with a filling 22 therein. The upstanding crust 24' will be crisp and/or flaky, rather than soggy, due to the virtual absence of absorbed moisture, and the filling 22 will be fresh and moist due to the lack of dehydration. The upstanding crust 24' may be relatively deep such as that depicted in the Figures. Such shape is ideal for thick pizza, pot pies and the like. As mentioned above, the upstanding crust may be somewhat shallower for thin pizza and similar food products.

I claim:

1. A food preparation process comprising the following steps in the order recited:
   a. providing an inedible, heatable container having a centrally-depressed receptacle which is defined by a base at the bottom of the container and sidewalls and with an outwardly and downwardly extending rim adjacent said sidewalls and terminating in a free edge;
   b. depositing a pre-prepared filling which becomes fluid when a sufficient amount of heat is applied to it into said container directly onto said depressed receptacle;
   c. covering said container receptacle and said container rim with a sheet of unbaked dough and shaping the dough so that said dough conforms to said outwardly and downwardly extending container rim so that upon baking, an inverted edible receptacle is formed including sidewalls and a centrally depressed bottom which will retain the filling when said edible receptacle is positioned such that its depressed bottom is lowermost;
   d. freezing the now-filled and covered container;
   e. inverting the frozen filled and covered container so that the dough sheet rests on a surface and the container rests on the dough sheet;
   f. heating the frozen inverted, filled container in an oven to bring the filling to a fluid state while forming a seal between the container rim and the dough sheet to prevent escape of the fluid; and
   g. removing the container whereby the seal is broken and the filling flows outwardly to fill the edible receptacle.

2. The process of claim 1 wherein during said covering step said dough is terminated short of the free edge of said container rim.

3. The process of claim 1 wherein said filling becomes very liquidy upon heating.

4. The process of claim 1 further comprising the additional step of heating the filled and covered container prior to said freezing step in order to pre-bake said dough sheet.

* * * * *